(12) United States Patent
Williams et al.

(10) Patent No.: US 9,452,716 B2
(45) Date of Patent: Sep. 27, 2016

(54) CUP HOLDER FOR TONNEAU COVER

(71) Applicant: Toyota Motor Engineering & Manufacturing North America, Inc., Erlanger, KY (US)

(72) Inventors: Paxton S. Williams, Milan, MI (US); Jay Leonard Sackett, Ann Arbor, MI (US); Keith O'Brien, Highland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/567,624

(22) Filed: Dec. 11, 2014

(65) Prior Publication Data

US 2016/0167592 A1    Jun. 16, 2016

(51) Int. Cl.
| | |
|---|---|
| *B60P 7/02* | (2006.01) |
| *B60R 11/00* | (2006.01) |
| *B60J 7/16* | (2006.01) |
| *B60R 13/07* | (2006.01) |
| *B60R 13/08* | (2006.01) |

(52) U.S. Cl.
CPC ............. *B60R 11/00* (2013.01); *B60J 7/1607* (2013.01); *B60R 13/07* (2013.01); *B60R 13/08* (2013.01); *B60R 2011/004* (2013.01); *B60R 2011/0082* (2013.01)

(58) Field of Classification Search
CPC ....... B60R 11/00; B60R 7/106; B60R 13/07; B60R 13/08; B60R 2011/004; B60R 2011/0082

See application file for complete search history.

(56) References Cited

U.S. PATENT DOCUMENTS

| | | |
|---|---|---|
| 4,852,843 A | 8/1989 | Chandler |
| 5,330,145 A | 7/1994 | Evans et al. |
| 5,335,960 A | 8/1994 | Benignu, Jr. |
| 5,524,958 A | 6/1996 | Wieczorek et al. |
| 5,573,214 A | 11/1996 | Jones et al. |
| 5,595,417 A | 1/1997 | Thoman et al. |
| 5,651,523 A | 7/1997 | Bridges |
| 6,189,755 B1 | 2/2001 | Wakefield |
| 6,361,009 B1 | 3/2002 | Li |
| 7,252,322 B2 | 8/2007 | Rusu |
| 7,815,235 B2 | 10/2010 | Hayashi et al. |
| 2001/0032791 A1 | 10/2001 | Hudson |

(Continued)

OTHER PUBLICATIONS

MOPAR, "Ram 1500 Tailgate Cover", retrieved from the Internet: <http://moparonlineparts.com/1500-tailgate-cover-o-2745.html>, [retrieved Apr. 27, 2016] publication date unknown (1 page).

*Primary Examiner* — Lori L Lyjak
(74) *Attorney, Agent, or Firm* — Christopher G. Darrow; Darrow Mustafa PC

(57) ABSTRACT

A folding tonneau cover or lid is configured for selectively enclosing at least a portion of an open topped bed of a pick up or SUV type motor vehicle. The tonneau cover includes one or a plurality of flexibly linked panels extending between cooperating side walls of the open topped bed, and is manually operable for displacement between a deployed position wherein the open topped bed is fully covered and a retracted position wherein the open topped bed is partially or fully exposed. At least one panel forms a generally planer first surface facing downwardly when in the deployed position and upwardly when in the retracted position, and a second surface facing upwardly when in the deployed position and downwardly when in the retracted position. A cup holder is integrated with one of the panel surfaces and forms a beverage container receiving cavity opening away from the panel surfaces.

20 Claims, 9 Drawing Sheets

(56) References Cited

U.S. PATENT DOCUMENTS

2008/0190977 A1* 8/2008 Estabrook ......... B62D 33/0273
  224/404
2010/0005828 A1 1/2010 Fedell
2011/0006092 A1 1/2011 Soma et al.
2012/0118930 A1 5/2012 Simon et al.
2013/0126691 A1 5/2013 Miklas

* cited by examiner

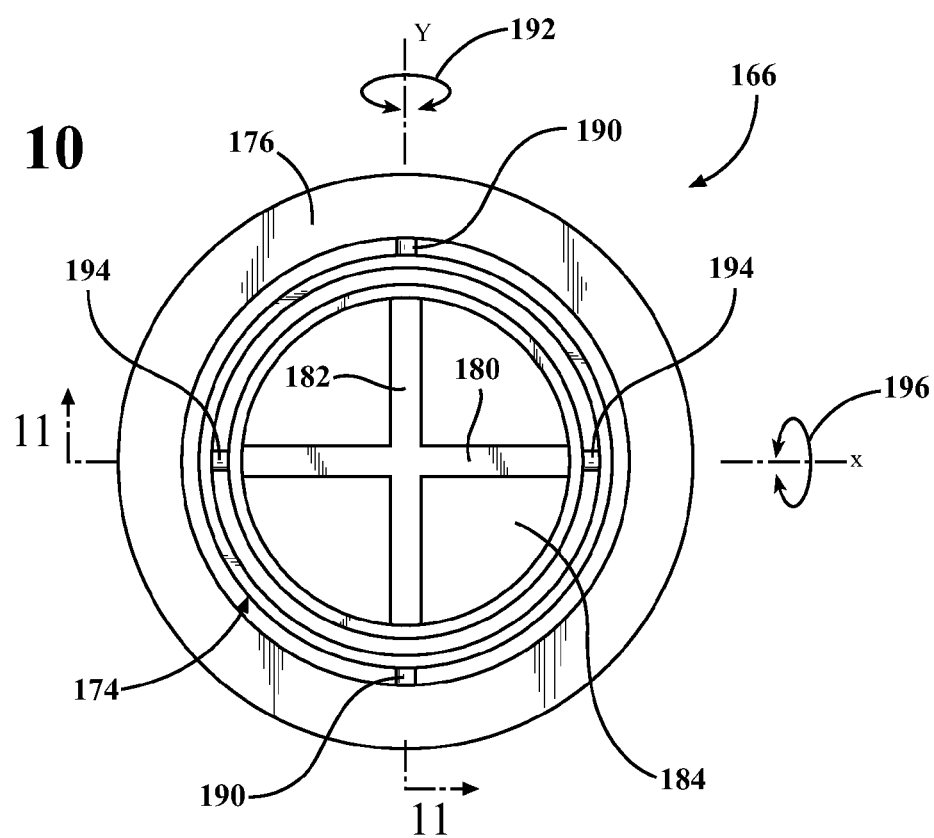
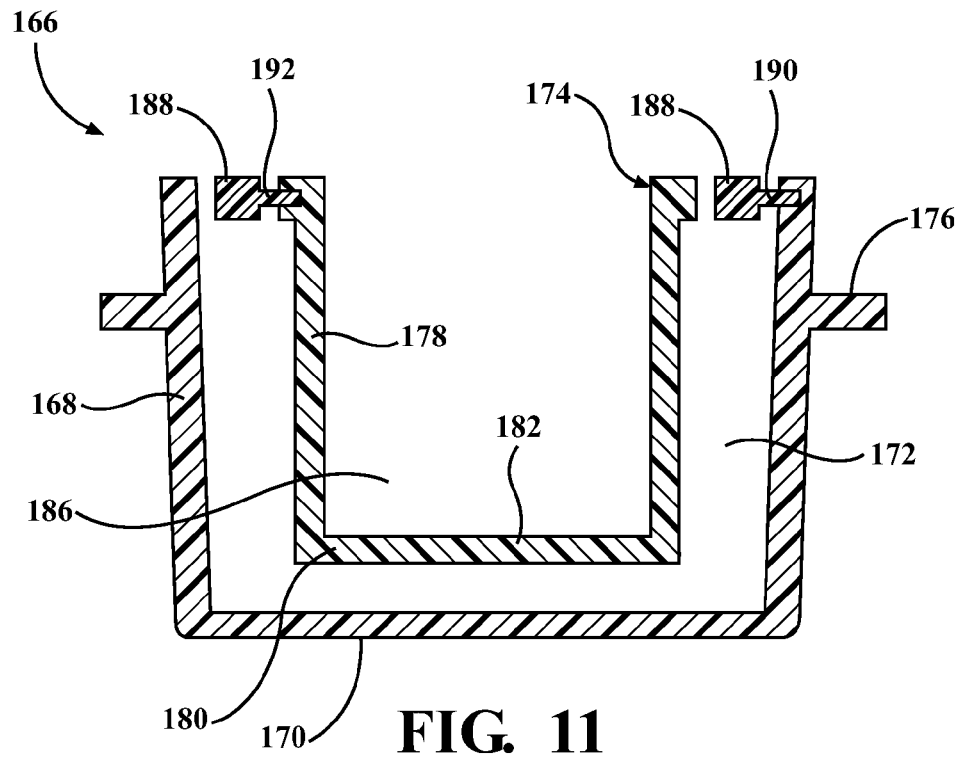

CUP HOLDER FOR TONNEAU COVER

TECHNICAL FIELD

The present disclosure relates cup holders in general and compact cup holders for automotive applications in particular.

BACKGROUND

Assemblies adapted for holding and supporting one or more beverage containers integrated within automobiles, theaters, stadiums and other seating areas for the occupant's convenience are generally referred to as cup holders.

Readily accessible and plentiful cup holders are desired by users of vehicles and other seating environments such as theaters and stadiums. In some locations, such as the rear seats of a vehicle passenger compartment, the potential locations for placing a conventional cup holder have been very limited due to the absence of horizontal surfaces and the lack of depth behind the available vertical surfaces, such as the trim surface of a vehicle side door or the back surface of the front passenger seats or console. Due to the limited area and the potential interference of a cup holder with a passenger's movements into or out of their seat, especially in the case of a rear seat passenger, it is also desirable to make the cup holder stowable into the door panel or other vertical surface.

Many prior attempts to package cup holders in these locations have produced flimsy designs which lack structural integrity, are difficult to use and are difficult to clean. It would be desirable to provide a cup holder that efficiently uses the limited packaging space available, has good mechanical strength, and is removable for cleaning.

When traveling in a motor vehicle, whether it is a short cross town commute or a trip of a longer duration, the occupants of a vehicle often find it enjoyable to consume a beverage while in route. For example, morning commuters often carry with them a hot beverage from the house or a convenient drive-thru service. At other times, the beverage may be contained in a bottle or can. In all of these situations, while the vehicle is moving the container can be easily upset if it is placed on the dash, floor, seat or center console. For obvious reasons, it is desirable to provide a stable support or holder for beverage containers when they are used in a vehicle.

Over the years, a number of devices have been developed to prevent a beverage container from spilling its contents within the vehicle. One such device is known as a travel mug. Travel mugs typically are available in two varieties, one which has a narrow opening and a wide base and another which includes a lid and sometimes a flanged bottom portion which can be slid into a base mounted on the dash or center console of the vehicle. Both of these mechanisms have limitations in that they require the use of a dedicated container, exclusive of other containers. Since the travel mug must always be present in the vehicle to reap its benefits, such other beverage containers can be inconvenient.

Another direction in which designers have evolved has been to develop "generic" cup holders which can receive and support numerous types, styles and sizes of beverage containers. One of the first of such cup holders was a one-piece plastic "hanger" which included a downwardly extending tab that, during use, was positioned so as to extend into the window opening generally between the glass of the window and the interior of the door. These cup holders were rigid structures and of limited use because they were bulky, easily broken, and sometimes interfered with turning the steering wheel or opening the door of certain vehicles. Cup holders have also been seen which fold down and generally operate as a tray on which the container can be placed.

Notwithstanding the forgoing, OEMs (i.e., original equipment manufacturers) have sought to develop retractable cup holders which are mounted within the vehicle. One such cup holder includes a tray which is mounted for sliding movement into a recess in the dash board of the vehicle. The tray may include one or more fixed circular apertures into which the beverage container can be received. Another type of OEM cup holder includes a pivoting tray having one or more fired circular apertures into which the beverage container can be received. These trays often pivot from a stored position to a horizontal "use" position in response to the opening of a cover door. The cover often operates as a rest for the bottom of a container received within the aperture of the tray.

As instrument panels have become increasingly crowded with electronic and ventilation equipment, cup holder trays with fixed circular apertures have fallen into disfavor. In an effort to reduce size, numerous assemblies have been developed where one or more retaining forms less than a complete aperture into which the container is received. These retaining members often pivot with respect to a cooperating tray-type member which defines the remaining portion for the container receiving aperture. While being slightly more structurally complicated than fixed ring cup holders, these assemblies allow the cup holder to occupy less space when stored.

Another current trend is to relocate the cup holder assembly from the instrument panel to another portion of the vehicle. Because it is desired to provide a compact cup holder which occupies a minimum amount of storage space, one location which has received considerable attention in the design of cup holders is the center console or fold down arm rest, respectively found in vehicles with bucket seats or split bench seats.

Generally, cup holders found in a center console or arm rest (i.e., center console/arm rest) consist of one of two types. In the first of these types, the cup holder pivots about a horizontal axis from a stored position, located within the center console/arm rest, into a use position where the beverage container can be received in it. Typically, this type of cup holder is used where the center console/arm rest also doubles as a center storage compartment and is provided with a hinged lid. The cup holder portion itself usually only occupies the forward end of the storage compartment.

The second type of center console/arm rest cup holder utilizes a drawer which slides into a recess defined in the center console/arm rest. In order to hold at least two containers, whose combined width is greater than that of a standard sized center console/arm rest, this type of cup holder must include features which will allow those portions of the cup holder which actually define the beverage container receiving apertures to occupy a reduced amount of space when stored in their non-use position. In accomplishing the above, cup holders have been proposed where each aperture which receives and holds a beverage container is defined in part by two elements, one of which is movable relative to the other.

Accordingly, one or more arms are provided so that they will laterally pivot relative to the drawer as the drawer is withdrawn from a recess in the center console/arm rest. Generally, these pivoting arms include a curved portion which cooperates with a curved recess in the drawer so that when the arms are fully extended a beverage container receiving aperture is generally defined by the two. One drawback of this type of design is that since the pivoting arms only define a portion of the beverage container receiving apertures, only one end of each pivoting arm is supported making the entire arm susceptible to instability problems. Another drawback is that these types of cup holders lack the ability to accept a beverage container having a handle, such as a coffee mug.

Because cup holders have become ubiquitous in contemporary automobiles, motorists now expect cup holders to firmly position beverage containers having a veritable plethora of shapes, sizes and materials. Because some beverage containers are conical and others are purely cylindrical, with all being formed from a variety of materials such as paper, plastic, aluminum, or yet other materials, and in configurations small and large, the task of positioning and securing each beverage container variant is complex.

It is desirable to provide an automotive cup holder which is both configuration and size adjustable. In addition to adjustability, it is further desirable to provide a cup holder having lighting to indicate, inter alia, where the cup holder is located, even when a beverage container has been installed into the cup holder.

Cup holders for mounting on the dashboard, door, seats or other convenient locations of an automobile are generally well known. The purpose of these types of holders is simply to retain a beverage container in a conveniently accessible stationary position, thus freeing the hands of the driver and other passengers, and minimizing the possibility of any spillage when the vehicle accelerates, decelerates, goes over bumps or makes abrupt turns. A problem that many vehicle drivers and passengers experience, however, is that their drinks eventually loose or gain heat when left in their holders for any appreciable length of time. Thus, an ice cold soft drink will become lukewarm if mounted on the dashboard of a vehicle driving through the hot summer sum, and a steaming hot coffee will lose its warmth in a vehicle during winter. Since many drinks are unpalatable when consumed at an incorrect temperature, they are often wasted.

Personal electronic devices (PEDs) such as cellular telephones have become increasingly popular, miniaturized and ubiquitous. It has become common for portable cellular telephones to be carried in automobiles for emergency and other use. Moreover, it has become common for people to utilize cellular telephones during operation of the automobile including not only driving stops at traffic lights, but also during motion of the vehicle. As a result, the problem of positioning a cellular telephone or other portable communicator in a position readily available to a vehicle occupant has presented a problem not only of convenience but also safety wherein vehicle occupants can be forced to divert their gaze to grasp a PED.

While new automobile designs have included PEDs positioned on and secured by special holders or cradles on the console or in other fixed positions within convenient reach of a vehicle occupant, many vehicles are not so equipped such that a vehicle occupant can grope for their PED positioned on the seat, floor or the glove compartment. It is accordingly desirable to be able to retrofit passenger vehicles with a stationary holder for a PED positioned within easy reach of an occupant and which provides a positive holding force to the PED in the holder. It is important that each occupant be able to retrieve and reposition the PED in the holder without diverting their attention.

A vehicle with an open top bed, such as employed with pick-up trucks, often incorporate tonneau covers of varying types. One such tonneau cover type comprises a one-piece rigid (e.g. metal or fiberglass) lid attached to the bed by an elongated piano-type hinge extending along either one of the lateral end edges or one of the longitudinal side edges of the tonneau cover. A second such tonneau cover type comprises a plurality of discrete rigid cover segments serially interconnected by elongated piano-type hinges which can be folded into a stacked configuration. A third such tonneau cover type comprises a flexible (e.g., vinyl or canvas) one-piece tarp releasably secured to the perimeter of the bed by releasable straps, snaps or Velcro members to provide access to the bed. A fourth such tonneau cover type comprises a flexible (e.g., vinyl) one-piece tarp secured to a scissors-type support structure which opens and closes in an accordion fashion.

It is desirable to provide an automotive cup holder within the open top bed of such a vehicle employed for commercial, camping or other off-road applications when one or more passengers are seated within the bed for extended periods.

Therefore, a need exists for a new and useful automotive cup holder which overcomes the problems of the prior art.

SUMMARY

A tonneau cover which is provided for selectively covering at least a portion of an open topped bed of a motor vehicle according to the several embodiments disclosed herein includes a cup holder which is deployed for utilization when the tonneau cover is in a retracted position and stowed out of view when the tonneau cover is in a deployed position.

According to an embodiment of the description, a tonneau cover is configured for selectively enclosing at least a portion of an open topped bed of a motor vehicle. The tonneau cover comprises at least one panel extending between cooperating walls of the open topped bed and displaceable between a deployed position and a retracted position. The at least one panel forms a surface facing downwardly when in the deployed position and upwardly when in the retracted position. A cup holder carried with the surface of the at least one panel forms a beverage container receiving cavity opening away from the tonneau panel surface.

According to another embodiment of the disclosure, a tonneau cover configured for selectively enclosing at least a portion of an open topped bed of a motor vehicle comprises at least one panel extending between cooperating side walls of the open topped bed and displaceable between a deployed position and a retracted position, the at least one panel forming a first surface facing downwardly when in the deployed position and upwardly when in the retracted position and a second surface facing upwardly when in the deployed position and downwardly when in the retracted position. A cup holder is carried with one of the surfaces of the at least one panel and forms a beverage container receiving cavity opening away from the one of the surfaces.

According to yet another embodiment of the disclosure, a tonneau cover configured for selectively enclosing at least a portion of an open topped bed of a motor vehicle includes a reversible rigid panel extending between cooperating walls of the open topped bed, the panel forming opposed first and second outer surfaces and a cup holder carried with the panel, the cup holder forming a beverage container receiving cavity opening away from the first and/or second surfaces of the panel.

These and other features and advantages of the disclosure will become apparent upon reading the following specification, which, along with the drawings, describes an embodiment of the disclosure in detail.

BRIEF DESCRIPTION OF THE DRAWINGS

The present apparatus will now be described, by way of example, with reference to the accompanying drawings, in which:

FIG. 10 is a top plan view of a third alternative embodiment of a cup holder including a two-axis gimbaled beverage container support structure;

FIG. 11 is a cross-sectional view of the cup holder taken along lines 11-11 of FIG. 10;

Although the drawings represent embodiments of the present apparatus, the drawings are not necessarily to scale and certain features may be exaggerated in order to illustrate and explain the present disclosure. The exemplification set forth herein illustrates an embodiment of the apparatus and method, in one form, and such exemplifications are not to be construed as limiting the scope of the present apparatus and method in any manner.

DETAILED DESCRIPTION

In the following Detailed Description, reference is made to the accompanying drawings, which form a part thereof, and in which is shown by way of illustration specific embodiments in which the disclosure may be practiced. In this regard, directional terminology, such as "top", "bottom", "front", "back", "leading", "trailing", etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. Furthermore, the axes (e.g., ±X, ±Y, and ±Z axes) are referenced on the drawings to provide a relative directional sense only. The following detailed description, therefore, is not to be taken in a limiting sense, and the scope of the present invention is defined by the appended claims.

For purposes of providing non-limiting definition and to enable clear understanding of the present disclosure, "longitudinal" means parallel to the direction of the Y axis, "lateral" means parallel to the direction of the X axis, and "vertical" means parallel to the direction of the Z axis.

The present disclosure describes a cup holder supported by a flexible tonneau cover or molded into a rigid tonneau cover on a side facing up when the tonneau cover is in a retracted position (e.g., opened) to provide a place for a user/occupant to place a beverage container while accessing or sitting in an open topped bed area of a motor vehicle. This feature provides convenience for the user/occupant to have a flat area and prevent sliding of the beverage container.

Figures 1, 2:
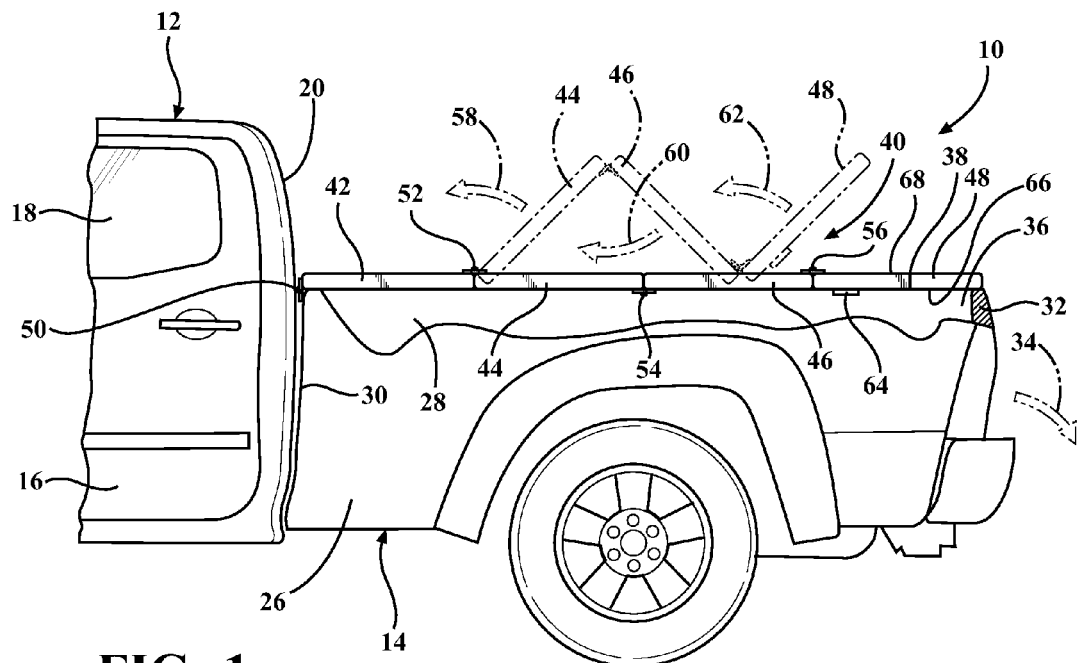
FIG. 1 is a left (e.g., driver's) side broken elevation view of an exterior of a vehicle (e.g., pick-up truck) with an articulated tonneau cover in a deployed position fully covering an open topped bed, and the tonneau cover (in phantom) in an alternate, partially retracted position.
FIG. 2 is a left side broken elevation view of the exterior of the vehicle (e.g., pick-up truck) of FIG. 1, with the tonneau cover in a fully retracted position exposing the open topped bed.

Referring to FIG. 1, a motor vehicle (e.g., a pick-up truck) 10 includes a cab portion 12 and an open topped bed portion 14. The cab portion 12 includes occupant access doors 16, a windshield (not illustrated), side windows 18 and a rear window 20. The rear window 20 typically can be selectively opened and closed by occupants of the cab portion 12 of the pick-up truck 10 for ventilation, as well as communication and passing objects between the cab portion 12 and the open topped bed portion 14 of the pick-up truck 10.

The open topped bed portion 14 is positioned behind the cab portion 12, and is typically a box-like structure including a generally rectangular floor panel 24, longitudinally extending left and right opposed side wall panels 26 and 28, respectively, a laterally extending front end panel 30 and a laterally extending rear tailgate panel 32. The side wall panels 26 and 28 as well as the front end panel 30 are typically permanently affixed to the floor panel 24 and one another in their respective illustrated positions. The lowermost edge of the tail gate panel 32 is attached to remainder of the open topped bed portion 14 by hinges (not illustrated) to permit opening/closing as suggested by an arrow 34 for providing user access to an interior cavity 36 defined by the open topped bed portion 14 of the pick-up truck 10.

Although the several embodiments of the present disclosure are implemented in a pick-up truck 10, it is to be understood that they can also be usefully employed in a closed vehicle setting such as a station wagon or sport utility vehicle (i.e., SUV) including a storage compartment, typically located behind the traditional designated occupant seating positions.

The uppermost edge surfaces of the left and right side wall panels 26 and 28, respectively, the front end panel 30 and the tailgate panel 32 fall on a common horizontal plane designated as a tonneau cover support surface 38. A tonneau cover 40 is carried atop the tonneau cover support surface 38. The tonneau cover 40 consists of four rigid panels 42, 44, 46 and 48, each extending between the left and right side wall panels 26 and 28, respectively, and collectively extending longitudinally to enclose the interior cavity 36 of the open topped bed portion 12 of the pick-up truck 10. The leading lateral edge of the forward most panel 42 is selectively connected to front end panel 30 of the open topped bed portion 14 by a release pin 50 or similar device. The trailing lateral edge of the forward most panel 42 is interconnected to the leading lateral edge of the adjacent panel 44 by a laterally extending piano-type elongated hinge 52. The trailing lateral edge of the adjacent panel 44 is interconnected to the leading lateral edge of the next adjacent panel 46 by a laterally extending piano-type elongated hinge 54. Lastly, the trailing lateral edge of the next adjacent panel 46 is interconnected to the leading lateral edge of the rearward most panel 48 by a laterally extending piano-type elongated hinge 56.

As illustrated in FIG. 1, the tonneau cover 40 is depicted in a deployed position. To gain access to the interior cavity 36 of the open topped bed portion 14 of the pick-up truck 10, an operator displaces the panels 44, 46 and 48 in an accordion-like fashion illustrated in phantom. Specifically, panel 44 is rotated counter clockwise about the axis of hinge 52 as suggested by arrow 58. Simultaneously, panel 46 is drawn longitudinally forwardly and rotated clockwise as suggested by arrow 60. Also, panel 48 is drawn longitudinally forwardly and rotated counter clockwise as suggested by arrow 62. This constriction continues until panels 44, 46 and 48 are momentarily oriented vertically in an abutting relationship. Lastly, panels 44, 46 and 48 are rotated in unison counter clockwise about the axis of hinge 52 and stacked atop the forward most panel 42 as illustrated in FIG. 2.

FIG. 2 illustrates the tonneau cover 40 in a retracted position. Suitable fasteners (not illustrated) can be employed to robustly retain the tonneau cover 40 to the open topped bed portion 14 of the pick-up truck 10, both in the deployed position and the retracted position.

A cup holder 64 is integrated within the tonneau cover 40 which is effectively hidden from view and usage when the tonneau cover 40 is in the deployed position and visible and usable by occupants within and standing adjacent the open topped bed portion of the pick-up truck 10 when the tonneau cover 40 is in the retracted position. Referring to FIG. 1, the rearward most panel 48, when in the extended position, forms a first surface 66 facing downwardly into the interior cavity 36 of the open topped bed portion 14 of the pick-up truck 10. The cup holder 64 is carried with the first surface 66. The rearward most panel 48 also forms a second surface 68 facing upwardly away from the interior cavity 36 of the open topped bed portion 14 of the pick-up truck 10.

Referring to FIG. 2, in the process of transitioning from the deployed position to the retracted position, the rearward most panel 48 is reversed, whereby in the retracted position, the first surface 66 of the rearward most panel 48 is facing upwardly and the second surface 68 of the rearward most panel 48 is facing downwardly. In this position, the cup holder 64 extends upwardly and is available for vehicle occupant usage.

Figure 3:
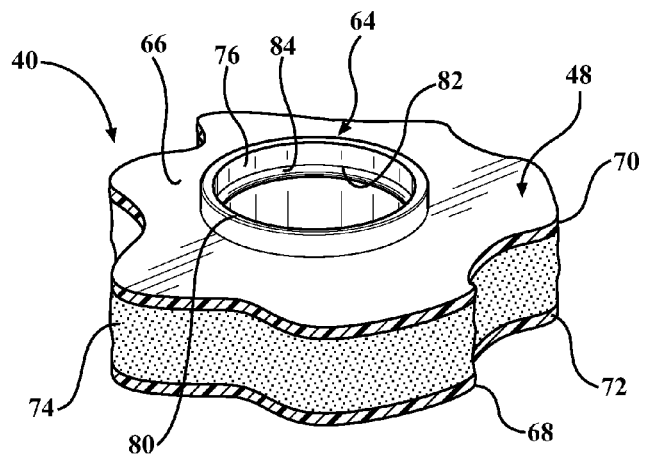
FIG. 3 is broken perspective view of a portion of one panel of the tonneau cover of FIG. 2 exposing an integrated cup holder.
Figure 4:
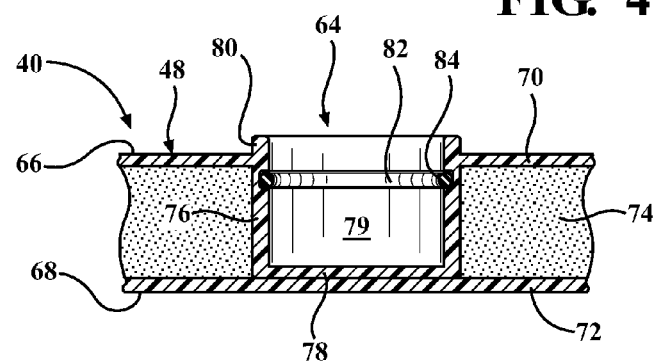
FIG. 4 is a broken cross-sectional view of the cup holder of FIG. 3.

Referring to FIGS. 3 and 4, the panels 42, 44, 46 and 48 comprising the tonneau cover 40 can be formed as a composite structure including outer layers 70 and 72 defining the first and second surfaces 66 and 68, respectively, and a center core 74. The outer layers 70 and 72 can be formed of injection molded thermoplastic or, alternatively, sheet metal. The center core 74 can be formed of lightweight foam or, alternatively, corrugated material. The resulting structure is extremely strong, lightweight and self-supporting.

The embodiment of the disclosure illustrated in FIGS. 3 and 4 includes the cup holder 64 integrally injection molded with the outer layer 70 forming the first surface 66 of the rearward most panel 48. The cup holder 64 includes a cylindrical wall 76 and a bottom wall 78 forming a well 79 for receiving a beverage container (not illustrated). The bottom wall 78 abuts the inner surface of the outer layer 72 of the rearward most panel 48. The cylindrical wall 76 extends upwardly from the bottom wall 78 of the rearward most panel 48, through the center core 74 and terminates above the first surface 66 of the outer layer 70, forming an annular flange 80. This structure encapsulates the center core 74, preventing moisture, either from ambient sources or spillage from a beverage container from accumulating between the outer layers 70 and 72, which could degrade the strength and longevity of the rearward most panel 48. Furthermore, the presence of the cup holder 64 is not discernable to an outside observer when the tonneau cover 40 is in the deployed position for cosmetic and vehicle performance purposes.

The inner surface of the cylindrical wall 76 has an inwardly opening annular groove 82 formed therein supporting a resilient O-ring seal 84. The O-ring seal 84 is dimensioned to slightly compressively load against a beverage container inserted within the cup holder 64 to prevent rattling and bouncing during operation of the pick-up truck 10.

Figure 5:
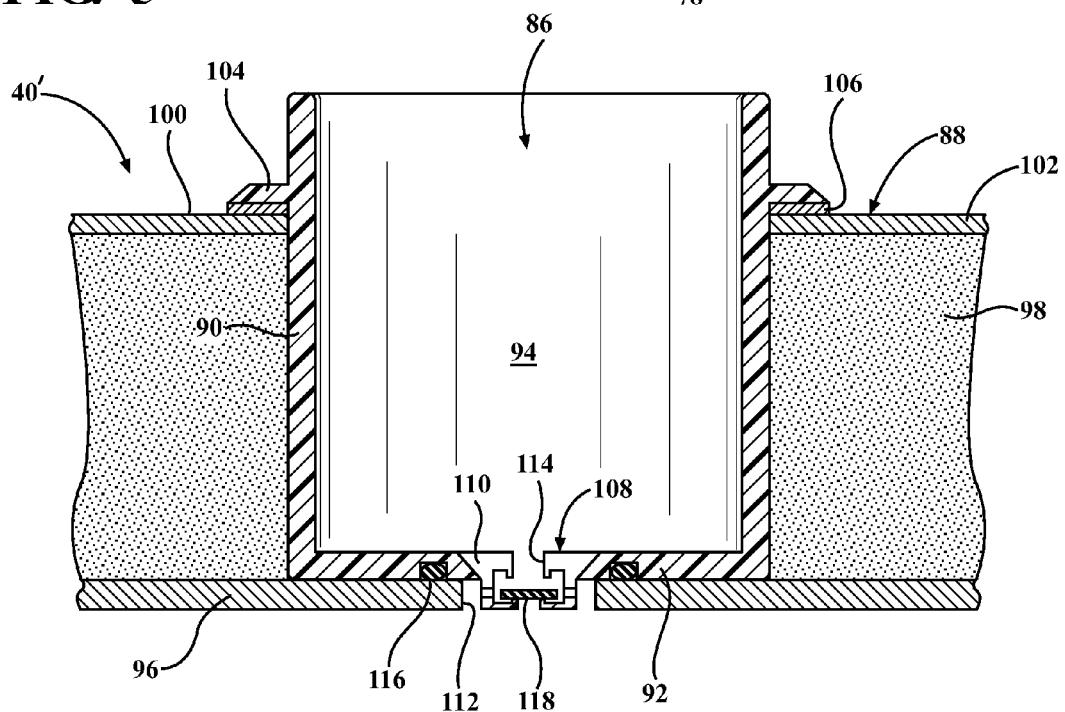
FIG. 5 is a broken cross-sectional view of an alternative embodiment of a cup holder installed within an associated tonneau cover panel.

Referring to FIG. 5, an alternative embodiment of the disclosure includes a cup holder 86 formed separately from an associated rearward most panel 88 of a tonneau cover 40' to which it is mounted. The cup holder 86 includes a cylindrical wall 90 and a bottom wall 92 forming a well 94 for receiving a beverage container (not illustrated) when the tonneau cover 40' is in a retracted position.

The bottom wall 92 abuts an inner surface of a first outer layer 96 of the rearward most panel 88. The cylindrical wall 90 extends away from the first outer layer 96 through a center core 98 and terminates above the outer surface 100 of a second outer layer 70. A radially outwardly extending annular flange 104 is formed on the cylindrical wall 90 which abuts the outer surface 100 of the second outer layer 102 through an intermediate annular seal 106. This structure encapsulates the center core 98, preventing moisture, either from ambient sources or spillage from a beverage container (not illustrated) from accumulating between the outer layers 96 and 102, which could degrade the strength and longevity of the rearward most panel 88.

Figure 6:
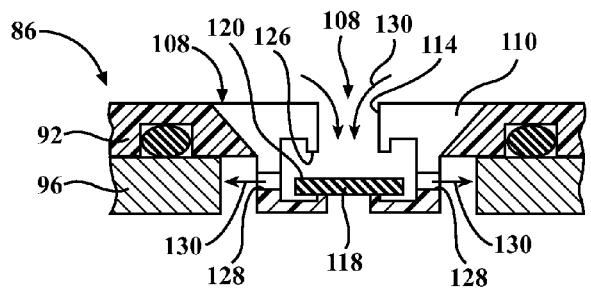
FIG. 6 is a broken cross-sectional view of a gravity drain valve of the cup holder of FIG. 5 on an enlarged scale with the drain valve in an open position.
Figure 7:
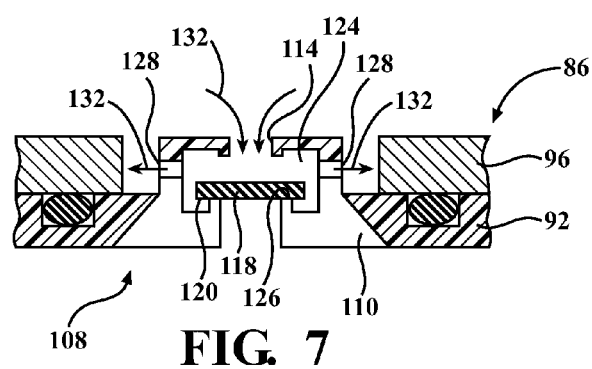
FIG. 7 is a broken cross-sectional view of a gravity drain valve of the cup holder of FIG. 5 on an enlarged scale with the drain valve in an closed position.

Referring to FIGS. 5-7, a gravity operated check valve 108 is integrally formed within the bottom wall 92 of the cup holder 86. The gravity operated check valve 108 has a body portion 110 extending through an opening 112 formed in the first outer layer 96 of the rearward most panel 88. The gravity operated check valve 108 forms a drain passage 114 selectively communicating the well 94 of the cup holder 86 with the interior cavity 36 of the open topped bed portion 14 of the pick-up truck 10. An annular seal 116 prevents moisture, either from ambient sources or spillage from a beverage container (not illustrated) from accumulating between the outer layers 96 and 102 of the rearward most panel 88. A check member 118 forming a seal surface 120 is displaceably disposed within a cavity 124 formed within the body portion 110 of the gravity operated check valve 108. The drain passage 114 forms a valve seat 126 cooperating with the check member 118.

As best viewed in FIG. 6, when the tonneau cover 40' is in the retracted position, exposing the cup holder 86 for usage, the gravity operated check valve 108 is open whereby liquid inadvertently admitted into the well 94 of the cup holder 86 passes into the drain passage 114, flows between the spaced apart seal surface 120 and valve seat 126 of the gravity operated check valve 108, and is discharged from the panel 88 via discharge ports 128 as illustrated by arrows 130.

As best viewed in FIG. 7, when the tonneau cover 40' is in the deployed position, hiding the cup holder 86 from usage, the gravity operated check valve 108 is closed whereby liquid inadvertently admitted into the drain passage 114 of the cup holder 86 passes directly through the cavity 124, and is discharged from the panel 88 via discharge ports 128 as illustrated by arrows 132. Thus incidental fluid (e.g., rain water) entering opening 112 is blocked from entering either the well 94 of the (inverted) cup holder 86 or between the layers 96 and 102 of the panel 88.

The cylindrical wall 90 extends away from the first outer layer 96 through a center core 98 and terminates above the outer surface 100 of a second outer layer 70. A radially outwardly extending annular flange 104 is formed on the cylindrical wall 90 which abuts the outer surface 100 of the second outer layer 102 through an intermediate annular seal 106. This structure encapsulates the center core 98, preventing moisture, either from ambient sources or spillage from a beverage container (not illustrated) from accumulating between the outer layers 96 and 102, which could degrade the strength and longevity of the rearward most panel 88.

Figure 8:
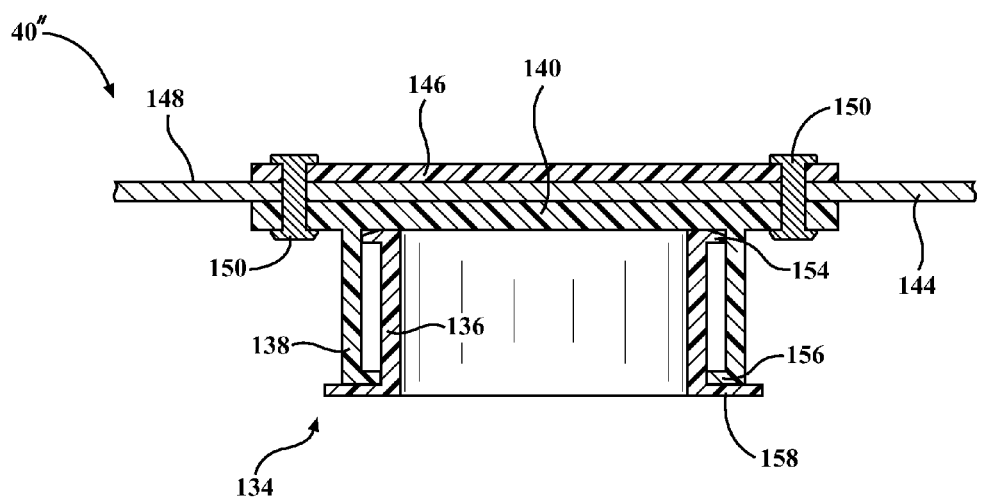
FIG. 8 is a broken cross-sectional view of a second alternative embodiment of a cup holder installed within an associated tonneau cover panel with the cup holder in a stowed position.
Figure 9:
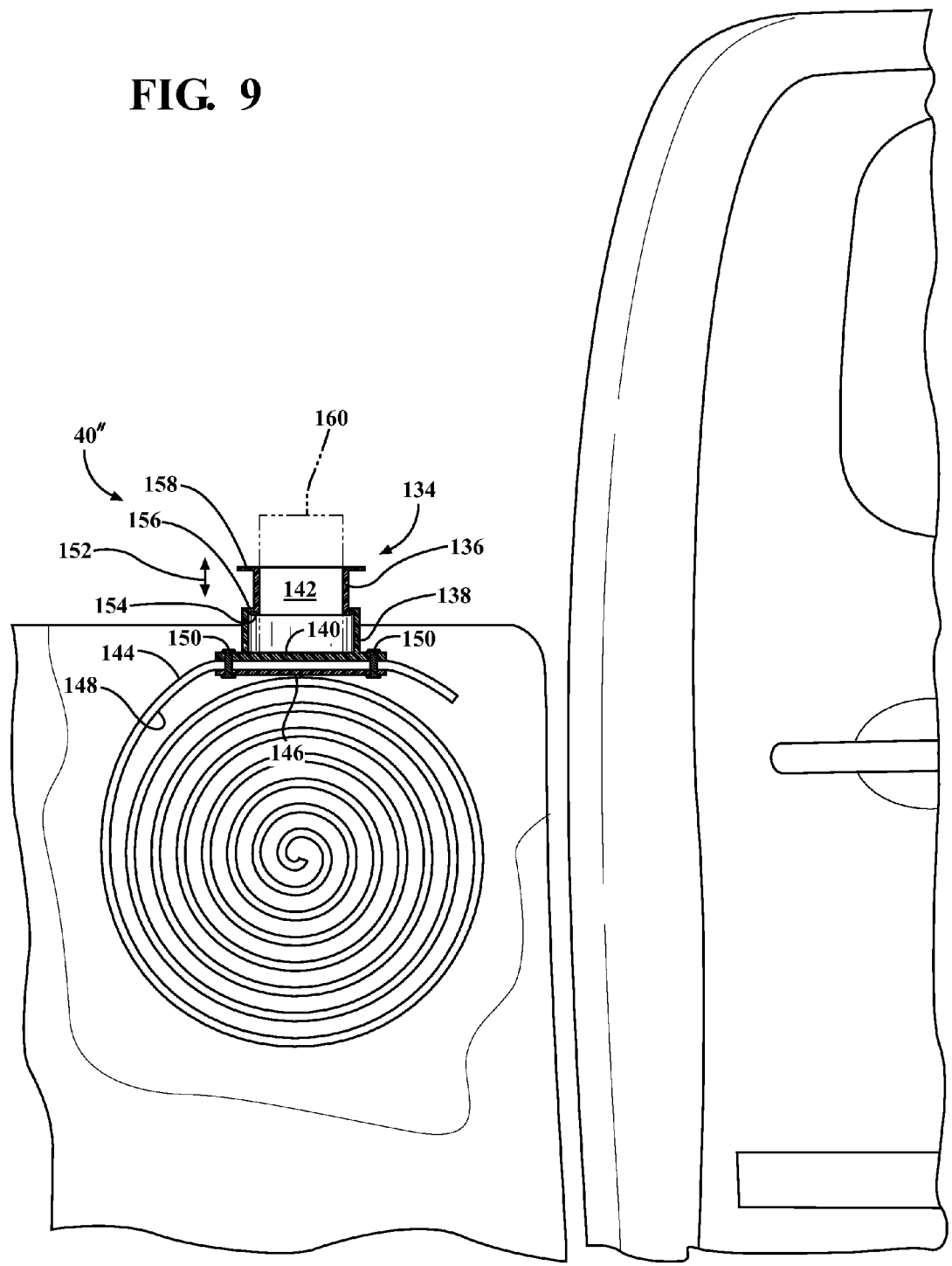
FIG. 9 is a broken cross-sectional view of the cup holder of FIG. 8 in an extended deployed position.

Referring to FIGS. 8 and 9, another alternative embodiment of the disclosure includes a cup holder 134 formed separately from an associated tonneau cover 40" to which it is mounted. The tonneau cover 40" in this embodiment can be formed from a single flexible layer of material such as leather, vinyl or the like, which can be transitioned from a substantially planer deployed position (illustrated in FIG. 8) to a rolled-up position (illustrated in FIG. 9). Alternatively, the cup holder can be affixed to a surface of a rigid tonneau cover 40 as described herein pertaining to FIGS. 1-4.

The cup holder 134 includes telescopingly engaging concentric inner and outer cylindrical wall members 136 and 138, respectively, and a bottom wall 140 integrally formed with the outer cylindrical wall member 138. The inner and outer cylindrical wall members 136 and 138, respectively and the bottom wall 140 collectively form a well 142 for receiving a beverage container (not illustrated) when the tonneau cover 40" is in a retracted position. The bottom wall 140 abuts a first surface 144 of the tonneau cover 40". A backing plate 146 abuts a second surface 148 of the tonneau cover 40" in register with the bottom wall 140 and is held in assembly therewith by suitable fasteners such as rivets 150. The backing plate 146 is intended for stabilizing the cup holder 134 when employed with a flexible tonneau cover 40" and is not required when employed with a rigid tonneau cover 40 (refer FIGS. 1-4).

Referring to FIG. 9, when the tonneau cover 144 is in the deployed position, the inner and outer cylindrical wall members 136 and 138, respectively, extend upwardly to enable utilization of the cup holder 134. The inner wall member 136 is slip fit within the outer wall member 138 to enable selective vertical adjustability as indicated by arrow 152. The inner and outer cylindrical wall members 136 and 138 form cooperating outwardly and inwardly directed flanges 154 and 156, respectively, serving as interfacing guides and stops for adjusting the vertical height of the well 142. The upward most end of the inner cylindrical wall member 136 forms an outwardly directed flange 158 serving as a finger grip for user adjustment purposes.

When fully extended as illustrated in FIG. 9, the cup holder 134 is suitable for supporting an elongated cylindrical beverage container 160. Alternatively, when compressed to minimize the vertical dimension of the well 142, the cup holder is suitable for supporting a handled container (e.g., coffee cup). The inner cylindrical wall member 136 is preferably infinitely vertically adjustable between its upper and lower limits of travel. Alternatively, ratchets or spaced mechanical detent (not illustrated) can be included to define predetermined intermediate positioning set points. Although two concentric cylindrical wall members 136 and 138 are described, it is contemplated that three or more concentric wall members or axially expandable material can also be employed.

Figure 14:
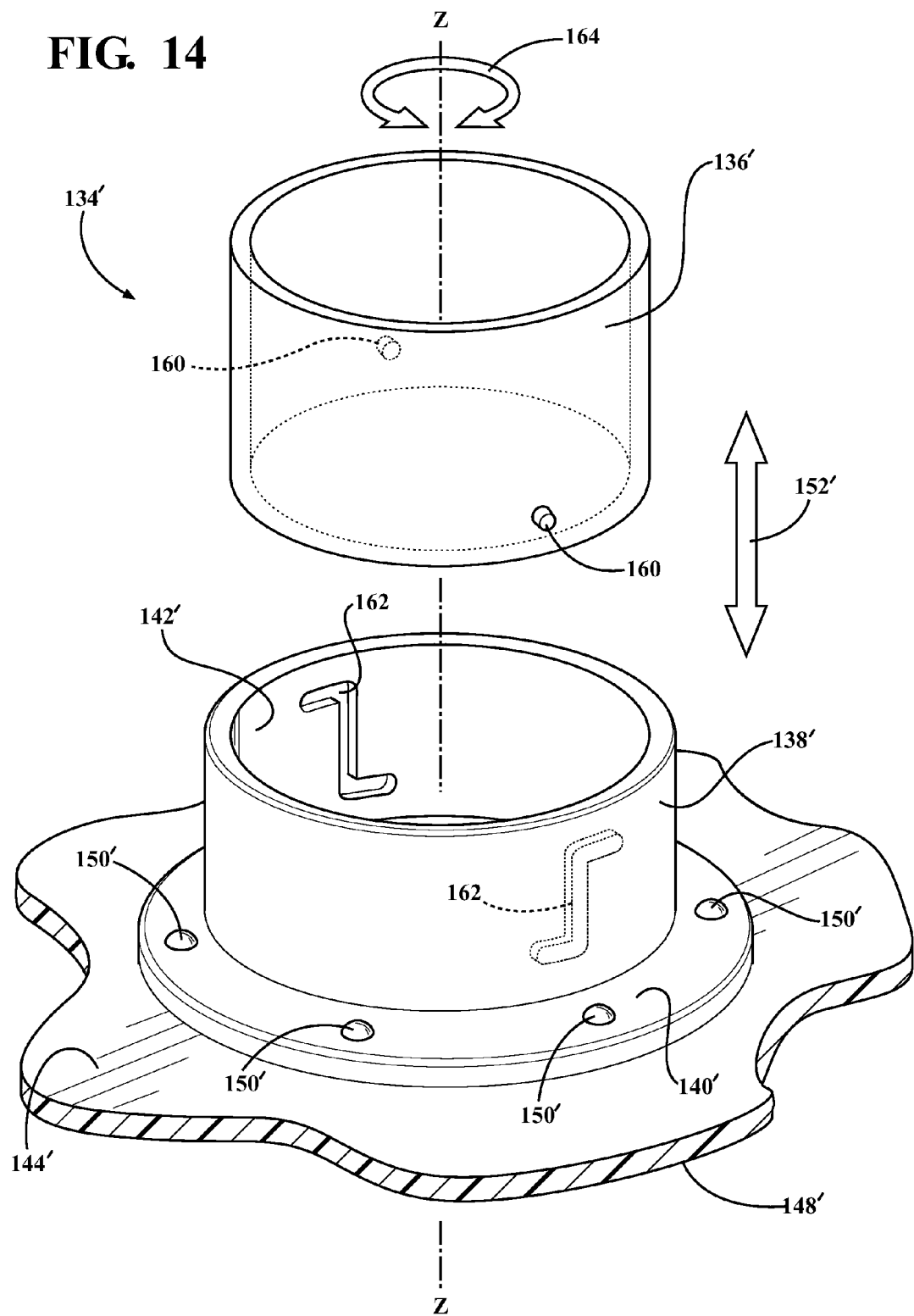
FIG. 14 is a broken perspective view of a sixth alternative embodiment of a cup holder installed within an associated tonneau cover panel with the cup holder selectively adjustable between a collapsed position and an extended position.

Referring to FIG. 14, an alternative adjustment feature for selectively fixedly positioning an inner cylindrical wall member 136' within an outer cylindrical wall member 138' of a cup holder 134' along an axis Z is illustrated. Locating guide tabs 160 integrally extending outwardly from the outer wall of the outer cylindrical wall member 138' cooperatively engage axially elongated inwardly opening guide slots 162 formed on the inner surface of the outer cylindrical wall member 138'. By simultaneously manually rotating the inner cylindrical wall member 136' with respect to the outer cylindrical wall member 138', as indicated by arrow 164, and axially repositioning the inner cylindrical wall member 136' with respect to the outer cylindrical wall member 138', as indicated by arrow 152', various depths of the well 142' of the cup holder 134' can be selected.

Referring to FIGS. 10 and 11, another alternative embodiment of the disclosure includes a cup holder 166 formed separately from an associated rearward most panel of a tonneau cover (not illustrated) to which it is mounted. The cup holder 166 includes a cylindrical outer wall 168 and a bottom wall 170 forming an outer well 172 for supporting a two axis gyroscopic cradle 174 which, in turn, supports a beverage container (not illustrated) when the tonneau cover is in a retracted position. A radially outwardly extending annular support flange 176 is formed on the cylindrical wall 168.

The two axis gyroscopic cradle 174 includes a cylindrical inner wall 178 and a bottom structure consisting of horizontal cross-beams 180 and 182 extending along an X axis and a Y axis, respectively. The cross-beams 180 and 182 provide openings 184 for discharging spilled liquid from an inner well 186 formed by two axis gyroscopic cradle 174 into the outer well 172. A gimbal ring 188 is concentrically disposed intermediate the top edges of the cylindrical outer wall 168 and cylindrical inner wall 178 of the cup holder 166. The gimbal ring 188 is attached to the cylindrical outer wall 168 by two opposed pivot pins 190 providing relative freedom of rotation about the Y axis as indicated by an arrow 192. The gimbal ring 188 is also attached to the cylindrical inner wall 178 by two opposed pivot pins 194 providing relative freedom of rotation about the X axis as indicated by an arrow 196.

Thus constructed, a beverage container (not illustrated) disposed within the inner well 186 will tend to remain in a vertical orientation during normal ranges of pitch, yaw and roll motions of the host motor vehicle 10.

Figure 12:
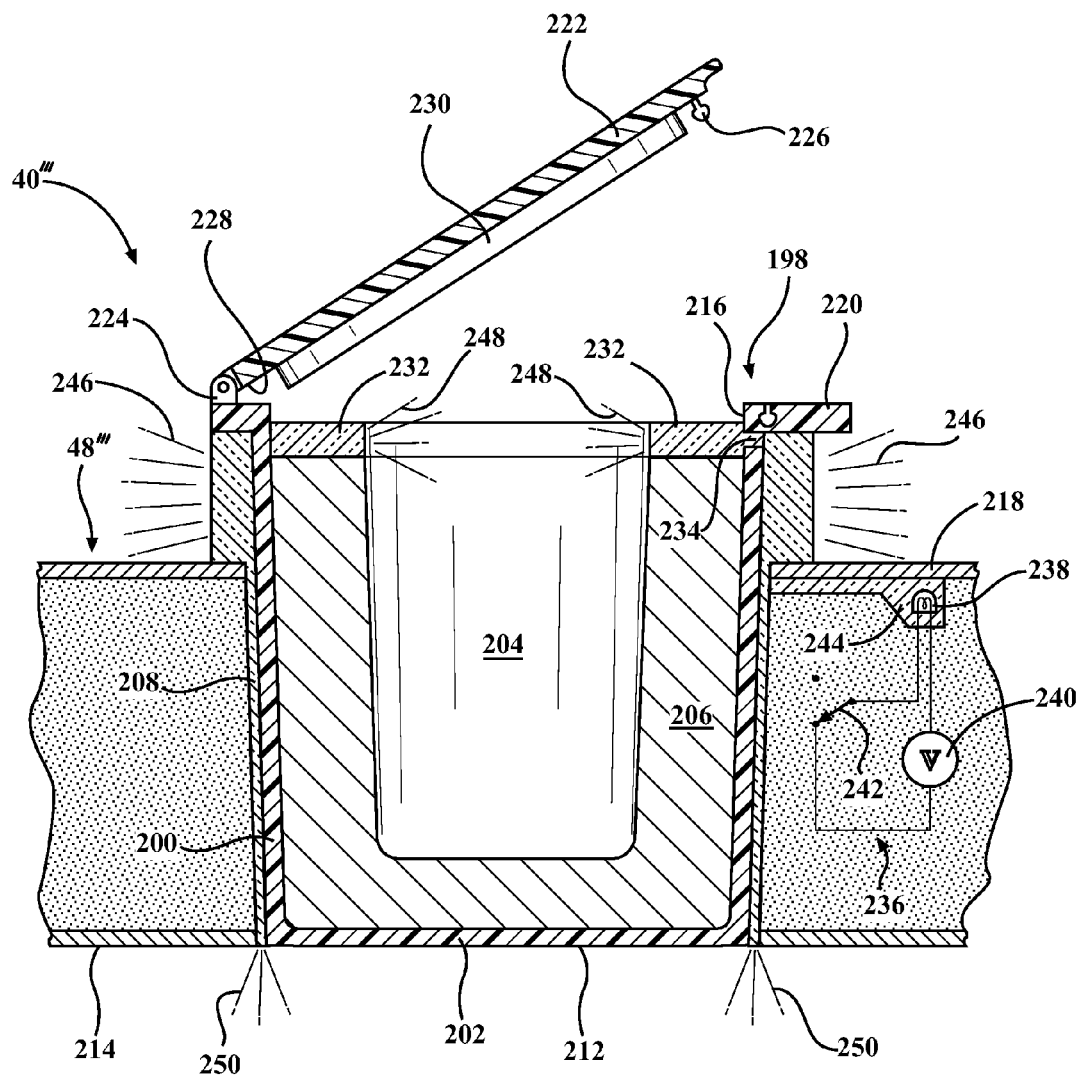
FIG. 12 is a broken cross-sectional view of a fourth alternative embodiment of a cup holder installed within an associated tonneau cover panel with the cup holder including thermal insulation and location illumination features.

Referring to FIG. 12, another alternative embodiment of the disclosure includes a cup holder 198 formed separately from an associated rearward most panel 48''' of a tonneau cover 40''' to which it is mounted. The cup holder 198 includes a cylindrical outer wall 200 and a bottom wall 202 forming a well 204 lined with thermally insulating material 206. The outer surface of the outer wall 200 of the cup holder 198 is coated with a layer of optically transparent or translucent material 208. The rearward most panel 40''' has a through bore 210 extending there through whereby the lower surface 212 of the bottom wall 202 of the cup holder 198 is substantially flush with the lower surface 214 of the rearward most panel 48'''. The upper opening 216 of the cup holder 198 extends above the upper surface 218 of the rearward most panel 48''' and forms a flange 220. A cover member 222 is attached to the flange 220 by a suitable hinge 224 and forms a snap closure pin 226. The lower surface 228 of the cover member 222 carries a layer of thermally insulating material 230. A beverage container containing relatively hot or cold liquid will be fully enclosed by insulating material 205 and 230. Further, the cover member 222 will, when in the closed position, minimize spillage of liquid due to movement of the host motor vehicle 10.

An illumination ring 232 constructed of optically transparent or translucent material is disposed within the well 204 atop the thermally insulating material 206. A transparent optical feed 234 extends through the outer wall 200 optically interconnecting the optically transparent or translucent material 208 coating the outer surface of the outer wall 200 with the illumination ring 232. An electrical lighting circuit 236 embedded within the tonneau cover 40''' includes at least one light source (e.g., light emitting diode) 238 in series circuit with a voltage source 240 and a gravity activated single pole single throw switch 242. The light source 328 is embedded within a light pipe 244 and when energized, illuminates the layer of optically transparent or translucent material 208 externally of the cup holder 198 and the illumination ring 232 internal of the cup holder 198. The switch 242 operates to electrify the light source 238 whenever the panel 48''' is in the retracted position and to disconnect the light source 238 from the voltage source whenever the panel 48''' is in the deployed position. Alternatively, a manual override switch or existing vehicle electrical system/fiber optic lines (not illustrated) can be provided for controllable illumination of the cup holder 198 at all times during operation of the host motor vehicle 10.

The electrical lighting circuit 236 provides a faint glow (e.g., light rays 246) about the outer periphery of the exposed upper portion of the outer wall 200 when the cup holder 198 is in use with the cover member 222 in the closed position and a brighter glow (e.g., light rays 232) when the cup holder 198 is in use with the cover member 222 in the opened position for the convenience of an occupant of the open topped bed portion 14 of the host motor vehicle 10. With an override switch, slight illumination can be provided externally of the motor vehicle 10 for cosmetic purposes when the tonneau cover 40''' is in the deployed position by the emission of a faint circle of light rays 250 from the bottom edge of the layer of transparent or translucent material 208.

Figure 13:
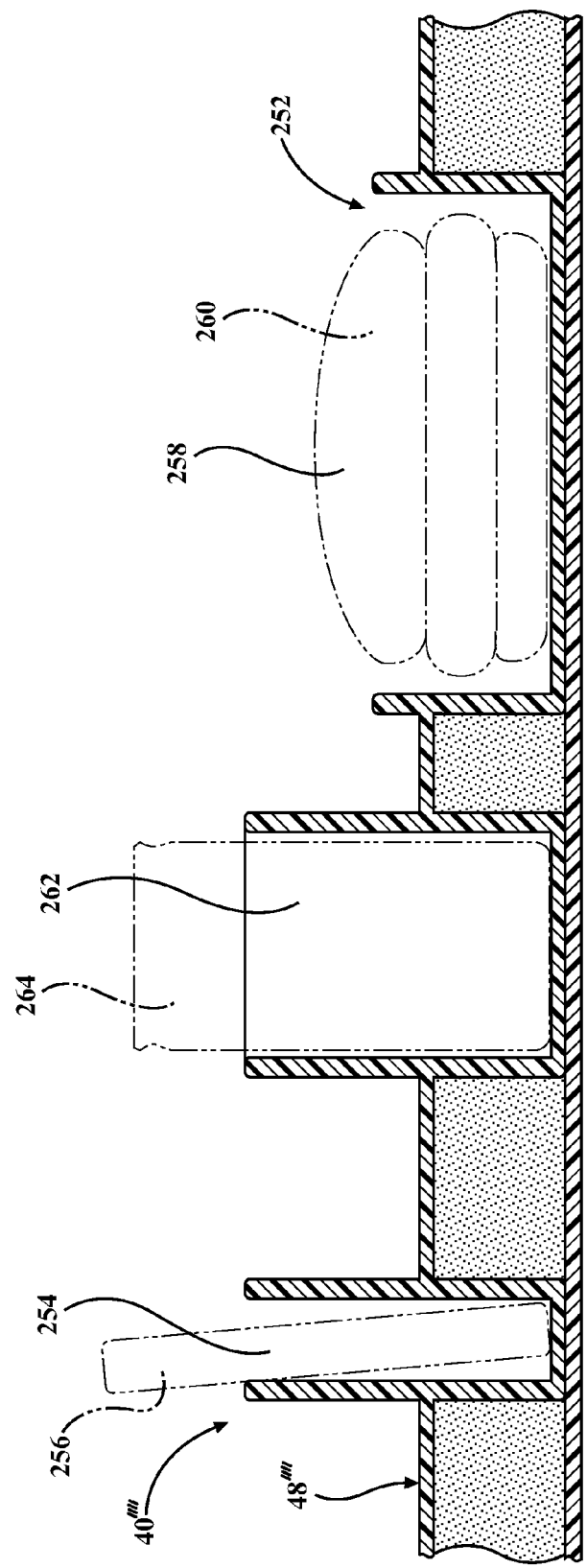
FIG. 13 is a broken cross-sectional view of a fifth alternative embodiment of a cup holder installed within an associated tonneau cover panel wherein the cup holder is integrally formed as part of an elongated tray also defining receiving cavities for additional items for the convenience of an open topped bed occupant.

Referring to FIG. 13, another alternative embodiment of the disclosure includes a cup holder 252 formed separately from an associated rearward most panel 48'''' of a tonneau cover 40'''' to which it is mounted. The cup holder 252 can be expanded to provide multiple functionally similar or disparate receptacles in a single integrally formed structure. For example, the cup holder 252 can define a first well 254 shaped to support a PED , a second well 258 shaped to support a food item 260, and a third well 262 shaped to support a beverage container 264. Multiple common purpose wells can alternatively be provided.

Figure 15:
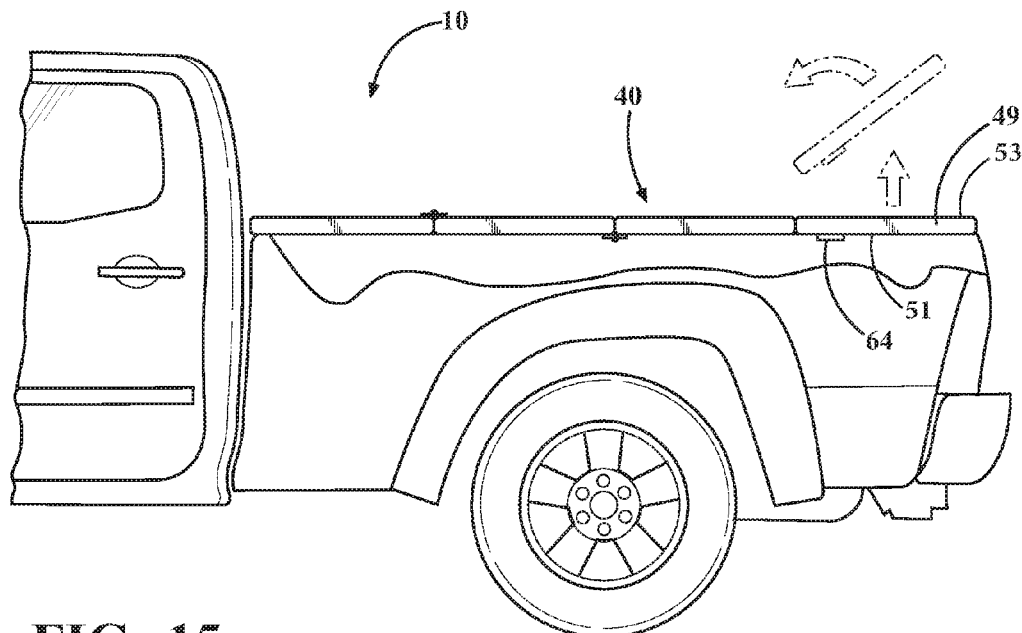
FIG. 15 is a left side broken elevation view of an exterior of a vehicle with tonneau cover in a deployed position fully covering an open topped bed, and a panel of the tonneau cover (in phantom) being reversed.
Figure 16:
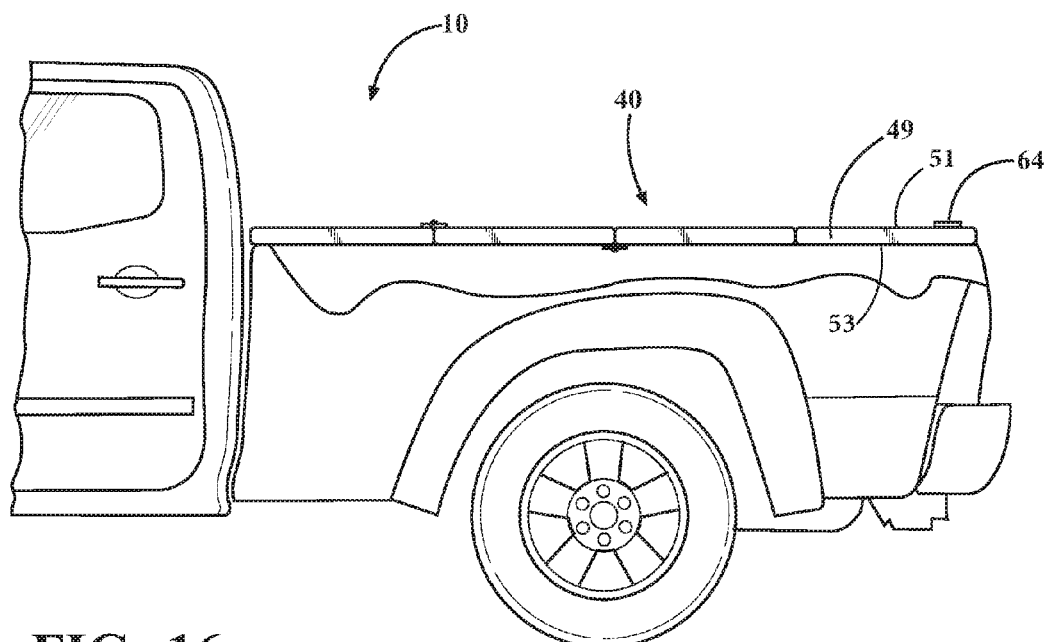
FIG. 16 is a left side broken elevation view of the exterior of the vehicle of FIG. 15 with the panel of the tonneau cover in a reversed position.

Referring to FIGS. 15 and 16, the tonneau cover 40 can include a reversible rigid panel 49. The reversible rigid panel 49 can extend between cooperating walls of the bed. The reversible rigid panel 49 can form a first surface 51 and an opposed second surface 53. The cup holder 64 can be carried with the reversible rigid panel 49, such that the cup holder 64 forms a beverage container receiving cavity opening away from the first and/or second surfaces 51, 53 of the reversible rigid panel 49.

It is to be understood that the present apparatus and method has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The present apparatus and method has been described in an illustrative manner, and it is to be understood that the terminology, which has been used is intended to be in the nature of words of description rather than of limitation.

Obviously, many modifications and variations of the present disclosure are possible in light of the above teachings. For example, the cup holder can be configured to be reversible whereby it can be carried with the tonneau cover in a deployed position with the tonneau cover in a deployed position, a retracted position or both. Furthermore, the cup holder can be formed of transparent material to facilitate illumination and user viewing of the contents. It is, therefore, to be understood that within the scope of the appended claims, wherein reference numerals are merely for illustrative purposes and convenience and are not in any way limiting, the present apparatus and method, which is defined by the following claims as interpreted according to the principles of patent law, including the Doctrine of Equivalents, may be practiced otherwise than is specifically described.

The invention claimed is:

1. A tonneau cover configured for selectively enclosing at least a portion of an open topped bed of a motor vehicle, said tonneau cover comprising:
   at least one panel extending between cooperating walls of said open topped bed and displaceable between a deployed position and a retracted position, said at least one panel forming a surface facing downwardly when in said deployed position and upwardly when in said retracted position; and
   a cup holder carried with the surface of said at least one panel and forming a beverage container receiving cavity opening away from said surface.

2. The tonneau cover of claim 1, wherein said at least one panel is self-supporting.

3. The tonneau cover of claim 1, wherein said at least one panel is formed of resilient sheet-like material.

4. The tonneau cover of claim 1, wherein said cup holder is integrally formed at least partially within said at least one panel.

5. The tonneau cover of claim 1, wherein said cup holder comprises at least two concentric cylindrical wall segments telescopingly adjustable between a collapsed orientation and an extended orientation.

6. The tonneau cover of claim 1, wherein said cup holder comprises a cylindrical wall portion and an end wall portion forming said beverage container receiving cavity.

7. The tonneau cover of claim 6, further comprising a resilient member extending radially inwardly from said cylindrical wall portion and operative to retain a beverage container within said beverage container receiving cavity.

8. The tonneau cover of claim 6, further comprising a liquid drain passage formed in said end wall portion, wherein said liquid drain passage comprises a check valve.

9. The tonneau cover of claim 8, wherein said check valve comprises a gravity operated check valve operative to open said drain passage when said cup holder is in a deployed orientation and to close said drain passage when said cup holder is in a stowed orientation.

10. The tonneau cover of claim 1, wherein said cup holder further comprises a personal electronic device carrying pocket or a personal item retention cavity integrally formed with said cup holder.

11. The tonneau cover of claim 1, wherein said cup holder is integrally formed with said at least one panel.

12. The tonneau cover of claim 1, wherein said surface is generally planer.

13. The tonneau cover of claim 1, wherein said tonneau cover is disposed to selectively enclose at least a portion of an external open topped bed of a motor vehicle, or is disposed to selectively enclose at least a portion of an open topped bed disposed within a cabin of a motor vehicle.

14. The tonneau cover of claim 1, wherein said cup holder comprises a displaceable top member, an internal/external illumination system and a thermally insulating liner.

15. The tonneau cover of claim 1, wherein said cup holder is selectively removable from said at least one panel.

16. A tonneau cover configured for selectively enclosing at least a portion of an open topped bed of a motor vehicle, said tonneau cover comprising:

at least one panel extending between cooperating side walls of said open topped bed and displaceable between a deployed position and a retracted position, said at least one panel forming a first surface facing downwardly when in said deployed position and upwardly when in said retracted position and a second surface facing upwardly when in said deployed position and downwardly when in said retracted position; and a cup holder carried with one of said surfaces of said at least one panel and forming a beverage container receiving cavity opening away from said one of said surfaces.

17. The tonneau cover of claim 16, wherein said at least one panel is selectively reversible to position said beverage container receiving cavity opening to extend away from said first or second surfaces of said at least one panel.

18. The tonneau cover of claim 5, wherein said at least two concentric cylindrical wall segments include cooperating interlocking engagement features operable to selectively axially position and lockingly engage said at least two cylindrical wall segments at various positions intermediate said collapsed orientation and said extended orientation.

19. The tonneau cover of claim 1, wherein said tonneau cover comprises a plurality of discrete rigid panel portions serially arranged longitudinally along the open topped bed and hingedly interconnected to enable accordion-like displacement between said deployed position and said retracted position, said at least one panel comprising one of said discrete rigid panel portions.

20. A tonneau cover configured for selectively enclosing at least a portion of an open topped bed of a motor vehicle, said tonneau cover comprising:

a reversible rigid panel extending between cooperating walls of said open topped bed, said panel forming opposed first and second outer surfaces; and a cup holder carried with said panel, said cup holder forming a beverage container receiving cavity opening away from said first or second surfaces of said panel.

* * * * *